United States Patent
Yang et al.

(10) Patent No.: US 12,528,181 B1
(45) Date of Patent: Jan. 20, 2026

(54) THREE-DEGREE-OF-FREEDOM PARALLEL ELECTROMAGNETIC VARIABLE STIFFNESS ACTUATOR AS AN END EFFECTOR FOR ROBOTIC GRINDING AND POLISHING

(71) Applicant: Huazhong University of Science and Technology, Wuhan (CN)

(72) Inventors: Jixiang Yang, Wuhan (CN); Xu Tang, Wuhan (CN); Han Ding, Wuhan (CN)

(73) Assignee: Huazhong University of Science and Technology, Wuhan (CN)

( * ) Notice: Subject to any disclaimer, the term of this patent is extended or adjusted under 35 U.S.C. 154(b) by 0 days.

(21) Appl. No.: 19/173,821

(22) Filed: Apr. 9, 2025

(30) Foreign Application Priority Data

Jul. 17, 2024 (CN) .......................... 202410960745.6

(51) Int. Cl.
*B25J 9/12* (2006.01)
*B25J 11/00* (2006.01)

(52) U.S. Cl.
CPC ............. *B25J 9/12* (2013.01); *B25J 11/0065* (2013.01)

(58) Field of Classification Search
CPC ........... B25J 9/003; B25J 9/12; B25J 11/0065
See application file for complete search history.

(56) References Cited

FOREIGN PATENT DOCUMENTS

| CN | 106737593 A | * | 5/2017 | ............ B25J 9/0045 |
|---|---|---|---|---|
| CN | 108869626 A | | 11/2018 | |
| CN | 110091314 A | * | 8/2019 | ............ B25J 9/0057 |
| CN | 209793281 U | | 12/2019 | |
| CN | 111687828 A | | 9/2020 | |
| CN | 115533877 A | * | 12/2022 | ............ B25J 9/0045 |
| CN | 116787486 A | | 9/2023 | |
| CN | 117450201 A | | 1/2024 | |
| CN | 117621144 A | | 3/2024 | |

* cited by examiner

*Primary Examiner* — William C Joyce
(74) *Attorney, Agent, or Firm* — Nitin Kaushik (57) ABSTRACT

A three-degree-of-freedom parallel electromagnetic variable stiffness actuator as an end effector for robotic grinding and polishing, comprising: non-stiffness electromagnetic drive branches, an electromagnetic spring drive branch, structural components, and peripheral sensor systems. There are three non-stiffness electromagnetic drive branches; three-degree-of-freedom motion can be generated through these three non-stiffness electromagnetic drive branches. For the electromagnetic spring drive branch, its driving component is an electromagnetic spring, which is responsible for providing adjustable stiffness. The actuator achieves a high-precision, high-flexibility control of the grinding and polishing end through a unique three-degree-of-freedom parallel structure.

5 Claims, 8 Drawing Sheets

Electromagnetic spring drive branch

THREE-DEGREE-OF-FREEDOM PARALLEL ELECTROMAGNETIC VARIABLE STIFFNESS ACTUATOR AS AN END EFFECTOR FOR ROBOTIC GRINDING AND POLISHING

CROSS-REFERENCE TO RELATED APPLICATIONS

The application claims priority to Chinese patent application No. 202410960745.6, filed on Jul. 17, 2024, the entire contents of which are incorporated herein by reference.

TECHNICAL FIELD

The present invention relates to the technical field of mechanical transmission devices, and more particularly relates to a three-degree-of-freedom parallel electromagnetic variable stiffness actuator as an end effector for robotic grinding and polishing.

BACKGROUND

In the realm of robotic force-controlled end-actuators for contact tasks, such as floating grinding equipment, single-degree-of-freedom mechanisms are employed predominantly in the prior art, which fail to meet requirements for high-precision polishing and grinding of complex curved surfaces. Consequently, a realization of a three-degree-of-freedom parallel end-force-controlled actuator capable of two rotational and one translational movement holds broad application prospects. Three-degree-of-freedom parallel mechanisms or devices are characterized by their compactness and high load-bearing capacity, thus garnering extensive research.

Traditional actuation devices drive objects through rigid designs, that is, by transmitting motion and force via a "motor+reducer+load" configuration. This connection method cannot achieve a compliant actuation and lacks a good environmental adaptability. When collisions with the environment occur, the energy cannot be buffered or stored. A certain degree of flexibility can be introduced through devices such as torsion springs.

Through the above analysis, problems and shortcomings of the existing technology are identified as follows:
(1) An introduction of flexibility through devices like torsion springs cannot alter a rigid nature of the drive structure, and the rigidity of the end effector cannot be changed, leading to a decrease in compliance in scenarios with environmental variations.
(2) Existing parallel mechanisms are complex in transmission and structure, bulky in size, and the motor driving often requires a use of motors in combination with reducers and other means.

SUMMARY

In light of existing technical problems, the present invention provides a three-degree-of-freedom parallel electromagnetic variable stiffness actuator as an end effector for robotic grinding and polishing.

The invention is implemented as follows: a three-degree-of-freedom parallel electromagnetic variable stiffness actuator as an end effector for robotic grinding and polishing includes:

non-stiffness electromagnetic drive branches, electromagnetic spring drive branches, structural components, and peripheral sensor systems;

wherein there are three non-stiffness electromagnetic drive branches, namely non-stiffness electromagnetic drive branch 1, non-stiffness electromagnetic drive branch 2, and non-stiffness electromagnetic drive branch 3, one end of the non-stiffness electromagnetic drive branches are directly connected to a moving end plate, and the other end of the non-stiffness electromagnetic drive branches are connected to a robotic fixed end plate, and the three non-stiffness branches of the same construction are evenly distributed around a central axis of the actuator.

Further, the electromagnetic spring drive branch is located at the central axis of the actuator, with one end directly connected to the moving end plate and the other end connected to the robotic fixed end plate.

Further, the electromagnetic spring drive branch and the three non-stiffness electromagnetic drive branches are all connected to the moving end plate and the robotic fixed end plate, forming a parallel transmission configuration.

Further, the non-stiffness electromagnetic drive branches include an electromagnetic direct-drive motor module, preload stiffness springs, linear bearings, a support connector 1, a support connector 2, linear bearing guide rails, a motor-side universal joint, a far motor-side universal joint, and a non-stiffness electromagnetic drive connecting rod.

Further, a transmission process of the non-stiffness electromagnetic drive branches is as follows: the electromagnetic direct-drive motor module generates a driving force, which moves along a line of the linear bearing guide rails through the support connector 1, and this linear moving is transmitted to the moving end plate via the motor-side universal joint, the non-stiffness electromagnetic drive connecting rod, and the far motor-side universal joint. The three non-stiffness electromagnetic drive branches with the same transmission route collectively act on the moving end plate, causing the moving end plate to produce two rotational and one translational movement.

Further, the electromagnetic direct-drive motor module includes ferromagnetic yoke plates, square permanent magnets, coil support plates, permanent magnet yoke support plates, and square coils.

Further, the linear bearing guide rails are equipped with four preload stiffness springs.

Further, the electromagnetic spring drive branches include an electromagnetic spring module, a circular permanent magnet bracket-connecting rod, a double-headed ball valve, a ball valve connecting rod, and a single-headed ball valve.

A stiffness transmission process of the electromagnetic spring drive branches is as follows: the electromagnetic spring module generates variable stiffness, which is transmitted to the moving end plate through the circular permanent magnet bracket-connecting rod, the double-headed ball valve, the ball valve connecting rod, and the single-headed ball valve. The use of the double-headed ball valve and the single-headed ball valve prevents an introduction of variable stiffness from constraining the degrees of freedom of the moving end plate.

Further, the electromagnetic spring module includes a circular permanent magnet and a circular coil, where the magnetic field generated by the circular coil is position-dependent, forming a non-uniformly distributed magnetic field along the axis, and an interaction between the magnetic field generated by the circular permanent magnet and the circular coil produces stiffness.

Further, the structural components and peripheral sensor systems include a main shaft, a main shaft clamp, a non-stiffness electromagnetic drive branch integrated fixing plate, a robotic fixed end plate, a moving end plate, a force sensor, and a grating scale displacement sensor.

Feedback from the force sensor and the grating scale displacement sensor can achieve a precise force control and a displacement control.

The main shaft, the main shaft clamp, the non-stiffness electromagnetic drive branch integrated fixing plate, the fixed plate of the robot, and the moving end plate can achieve fixation and processing of the robot end.

Combining the above technical solutions and the addressed technical problems, advantages and positive effects of the technical solution protected by the present invention are as follows:

First, the invention designs a three-degree-of-freedom parallel electromagnetic variable stiffness actuator as an end effector for robotic grinding and polishing, whose stiffness can be configured in real-time by controlling a current of the electromagnetic spring, directly acting on the moving end plate, improving an applicability of the actuator, and providing better processing performance when facing complex part processing.

The invention designs a three-degree-of-freedom parallel electromagnetic variable stiffness actuator as an end effector for robotic grinding and polishing, where the three degrees of freedom are directly generated by an electromagnetic direct-drive motor transmission, compared with traditional three-degree-of-freedom parallel mechanisms, it has an actuator performance of a high response, a low delay, and a high compliance, providing a higher force control and a posture control accuracy.

The invention designs a three-degree-of-freedom parallel electromagnetic variable stiffness actuator as an end effector for robotic grinding and polishing, where the three-degree-of-freedom drive is realized by an electromagnetic direct-drive motor, the end stiffness is realized by an electromagnetic spring, and the stiffness transmission branch and the motion branch are decoupled, achieving decoupled control of three-degree-of-freedom motion and stiffness, reducing control costs.

The invention designs a three-degree-of-freedom parallel electromagnetic variable stiffness actuator as an end effector for robotic grinding and polishing, while introducing a rigid electromagnetic drive chain, it improves the traditional drive chain to a non-stiffness electromagnetic drive chain. Through ingenious circumferential symmetric design and structural design, the entire actuator is effectively integrated.

Ultimately, the technical solution of the present invention solves the technical problems that people have long desired to solve but have never succeeded: it solves the following problems for high-precision and compliant processing technology of complex curved surfaces by robots: precise stiffness adjustment and force control, compliant and high-precision posture adjustment, actuator performance of high response and low delay.

A core of the technical solution of the present invention lies in the development of a three-degree-of-freedom parallel electromagnetic variable stiffness actuator as an end effector for robotic grinding and polishing, whose necessary technical features include: non-stiffness electromagnetic drive branches, whose drive motor is an electromagnetic direct-drive motor module, and according to the force transmission characteristics, this force is completely compliant; three-degree-of-freedom motion can be generated through three non-stiffness electromagnetic drive branches; an electromagnetic spring drive branch, whose drive motor is an electromagnetic spring, is responsible for providing adjustable stiffness; and well-designed structural components and peripheral sensor systems, are used for ingenious connections between structures and achieving precise force and displacement control. This comprehensive technical feature makes the actuator flexible, efficient, and adaptable in the field of robotics.

The invention is implemented as follows: a three-degree-of-freedom parallel electromagnetic variable stiffness actuator as an end effector for robotic grinding and polishing, characterized by comprising non-stiffness electromagnetic drive branches, electromagnetic spring drive branches, and structural components and peripheral sensor systems.

Second, the expected benefits and commercial value of the technical solution of the present invention after transformation are:

improving processing efficiency and accuracy: in high-precision grinding and polishing operations, robots can complete tasks more quickly and accurately, reducing manual intervention and error rates. Reducing maintenance costs: by using non-stiffness electromagnetic drive and electromagnetic springs, a wear and failure rate of traditional rigid drive systems are reduced, extending a service life of the equipment. Broadening application fields: this technology is not only applicable to robotic grinding and polishing operations but can also be extended to other fields requiring high-precision force control, such as medical surgical robots, precision assembly, and the like.

The technical solution of the present invention fills the technical gap in the industry at home and abroad:

Currently, there is a lack of robot end actuators on the market that can simultaneously achieve high-precision force control and adjustable stiffness. Traditional single-degree-of-freedom mechanisms and rigid drive methods cannot meet the high-precision grinding and polishing requirements of complex curved surfaces. The present invention fills this technical gap by introducing a three-degree-of-freedom parallel electromagnetic variable stiffness actuator, providing a new solution that is expected to be widely applied and recognized in the domestic and foreign markets.

The technical solution of the present invention solves the technical problems that people have long desired to solve but have never succeeded:

the invention solves the problem that traditional drive devices cannot achieve compliant drive, realizing high-precision force control and posture control while achieving real-time adjustable stiffness through the introduction of electromagnetic springs. This technological breakthrough is of great significance in scenarios requiring high-precision and compliant processing of complex curved surfaces by robots, solving a long-standing problem in the industry of balancing high precision and compliance.

The technical solution of the present invention overcomes technical biases:

The invention overcomes the technical biases of rigid design and complex transmission structures in traditional mechanical transmission devices through the innovative design of non-stiffness electromagnetic drive branches and electromagnetic spring drive branches. The traditional view holds that high precision and compliance are difficult to balance, but the present invention achieves actuator performance of high precision, low delay, and high compliance through ingenious design and technological innovation, breaking through this technical bias and pioneering a new direction for robotic force-controlled end actuators.

Third, the present invention proposes a three-degree-of-freedom parallel electromagnetic variable stiffness actuator as an end effector for robotic grinding and polishing, whose design is uniquely innovative, effectively solving multiple problems in existing technology and achieving significant technological progress.

Firstly, the actuator achieves a high-precision, high-flexibility control of the grinding and polishing end through a unique three-degree-of-freedom parallel structure. This design allows the actuator to move and rotate freely in multiple directions, more accurately adapting to complex shapes and contours of workpiece surfaces, improving quality and efficiency of grinding and polishing operations.

Secondly, the parallel transmission form of the electromagnetic spring drive branches and the non-stiffness electromagnetic drive branches in the present invention provides the actuator with a rich range of stiffness variations. This design allows the actuator to adjust its stiffness in real-time according to operational requirements, effectively coping with changes in different workpiece materials and grinding and polishing forces while maintaining high precision, improving the stability and reliability of operations.

Additionally, an innovative design of the non-stiffness electromagnetic drive branches is a highlight of the present invention. These branches achieve a high-precision, non-stiffness drive of the moving end plate through the ingenious combination of components such as the electromagnetic direct-drive motor module, preload stiffness springs, and linear bearings. This design not only reduces the complexity and cost of the actuator but also improves its response speed and precision.

In summary, the present invention successfully solves multiple technical problems in the end-actuator aspect of existing grinding and polishing robots through a unique three-degree-of-freedom parallel structure, a rich range of stiffness variations, and an innovative non-stiffness electromagnetic drive branch design. The implementation of the present invention will significantly improve the precision, efficiency, and stability of grinding and polishing operations, injecting new vitality into the development of industrial automation and intelligent manufacturing fields.

In the drawings: 101, ferromagnetic yoke plate; 102, square permanent magnet; 103, coil support plate; 104, permanent magnet yoke plate support plate; 105, square coil; 201, circular permanent magnet bracket-connecting rod; 202, circular permanent magnet; 203, circular coil; 301, far motor-side universal joint; 302, non-stiffness electromagnetic drive connecting rod; 303, preload stiffness spring; 304, linear bearing; 305, support connector 1; 306, motor-side universal joint; 307, support connector 2; 308, linear bearing guide rail; 309, double-headed ball valve; 310, ball valve connecting rod; 311, single-headed ball valve; 401, main shaft; 402, main shaft clamp; 403, non-stiffness electromagnetic drive branch integrated fixing plate; 404, robotic fixed end plate; 405, moving end plate; 406, force sensor; 407, grating scale displacement sensor.

DETAILED DESCRIPTION OF THE EMBODIMENTS

In order to make objectives, technical solutions, and advantages of the present invention clearer, the following describes the invention in further detail with reference to specific embodiments. It should be understood that the specific embodiments described herein are only intended to explain the invention and not to limit it.

Embodiment 1: Surface Grinding of Smartphone Casings

Smartphone casings are typically made of materials such as aluminum alloy, stainless steel, or glass, requiring precise surface grinding to ensure smoothness, absence of defects, and high-quality tactile and visual appearance.

(1) Installation and Configuration:

Three non-stiffness electromagnetic drive branches and an electromagnetic spring drive branch are installed at the end of the smartphone casing grinding robot.

Each non-stiffness electromagnetic drive branch is ensured to be evenly distributed around the central axis of the actuator and connected to the moving end plate and the robotic fixed end plate.

(2) Force Control and Stiffness Adjustment:

A stiffness of the non-stiffness electromagnetic drive branches is adjusted using the electromagnetic direct-drive motor module and preload stiffness springs based on a hardness of the smartphone casing material.

During grinding, the grinding force and displacement is monitored in real-time through the sensor system, dynamically adjusting the stiffness of the electromagnetic spring drive branch to ensure uniform and stable surface grinding force.

(3) High-Precision Grinding:

A position and motion trajectory of the moving end plate is controlled to enable the robot to precisely follow surface contours of the smartphone casing for grinding.

The non-stiffness electromagnetic drive branches provide flexible motion and force control, allowing the robot to adapt to complex curved structures, ensuring consistent and high-quality grinding results.

By using the three-degree-of-freedom parallel electromagnetic variable stiffness actuator, the surface grinding process for smartphone casings becomes more efficient and precise, significantly improving surface quality, reducing scratches and defects, and enhancing an overall appearance and user experience of the product.

Embodiment 2: Polishing of Automotive Engine Cylinder Inner Walls

The inner walls of automotive engine cylinders require high-precision polishing to reduce friction and improve engine performance and lifespan. The inner walls have complex geometries and high machining precision requirements, which are difficult to be met by traditional polishing methods.

(1) Installation and Configuration:

Three non-stiffness electromagnetic drive branches and an electromagnetic spring drive branch are installed at the end of the robot used for polishing the inner walls of engine cylinders.

The three non-stiffness electromagnetic drive branches are ensured to be evenly distributed around the central axis of the actuator and connected to the moving end plate and the robotic fixed end plate.

(2) Force Control and Stiffness Adjustment:

The stiffness of the non-stiffness electromagnetic drive branches are adjusted using the electromagnetic direct-drive motor module and preload stiffness springs based on the material and structural characteristics of the cylinder inner walls.

During polishing, the polishing force and displacement is monitored in real-time through the sensor system, dynamically adjusting the stiffness of the electromagnetic spring drive branches to adapt to complex shapes and varying stiffness of different parts of the cylinder inner walls.

(3) High-Precision Polishing:

The position and motion trajectory of the moving end plate is controlled to enable the robot to precisely follow complex geometric shapes of engine cylinder inner walls for polishing.

The non-stiffness electromagnetic drive branches provide flexible motion and force control, allowing the robot to adapt to the curved structures of the inner walls, ensuring consistent and high-quality polishing results.

By using the three-degree-of-freedom parallel electromagnetic variable stiffness actuator, the polishing process for the engine cylinder inner walls becomes more efficient and precise, significantly improving surface smoothness, reducing friction, extending an engine lifespan, and enhancing engine performance and reliability.

The above two specific embodiments demonstrate an application of this actuator in the surface grinding of smartphone casings and the polishing of automotive engine cylinder inner walls. Through high-precision force control and stiffness adjustment, high-quality grinding and polishing results are achieved for complex surfaces.

A core of the technical solution of the present invention lies in a development of a three-degree-of-freedom parallel electromagnetic variable stiffness actuator as an end effector for robotic grinding and polishing. Its essential technical features include: non-stiffness electromagnetic drive branches, whose driving motor is an electromagnetic direct-drive motor module, providing completely compliant force according to the force transmission characteristics; three non-stiffness electromagnetic drive branches enabling three-degree-of-freedom motion; an electromagnetic spring drive branch, whose driving motor is an electromagnetic spring, providing adjustable stiffness; and carefully designed structural components and peripheral sensor systems for clever connections between structures and precise force and displacement control. This comprehensive set of technical features makes the actuator highly flexible, efficient, and adaptable in the field of robotics.

The invention is implemented as follows: a three-degree-of-freedom parallel electromagnetic variable stiffness actuator as an end effector for robotic grinding and polishing, characterized by comprising non-stiffness electromagnetic drive branches, an electromagnetic spring drive branch, and structural components with peripheral sensor systems.

As shown in FIGS. 1-8, the non-stiffness electromagnetic drive branches provided by the embodiments of the present invention include three branches: non-stiffness electromagnetic drive branch 1, non-stiffness electromagnetic drive branch 2, and non-stiffness electromagnetic drive branch 3. One end of each non-stiffness electromagnetic drive branch is directly connected to the moving end plate 405, while the other end of each non-stiffness electromagnetic drive branch is connected to the robotic fixed end plate 404. The three branches of the same construction are evenly distributed around the central axis of the actuator.

To reduce a volume of the actuator and ensure stiffness transmission, the electromagnetic spring drive branch provided by the embodiments of the present invention is located at the central axis of the actuator, with one end directly connected to the moving end plate 405 and the other end connected to the robotic fixed end plate 404.

The electromagnetic spring drive branch and the three non-stiffness electromagnetic drive branches are all connected to the moving end plate 405 and the robotic fixed end plate 404, forming a parallel transmission configuration.

Figure 1:
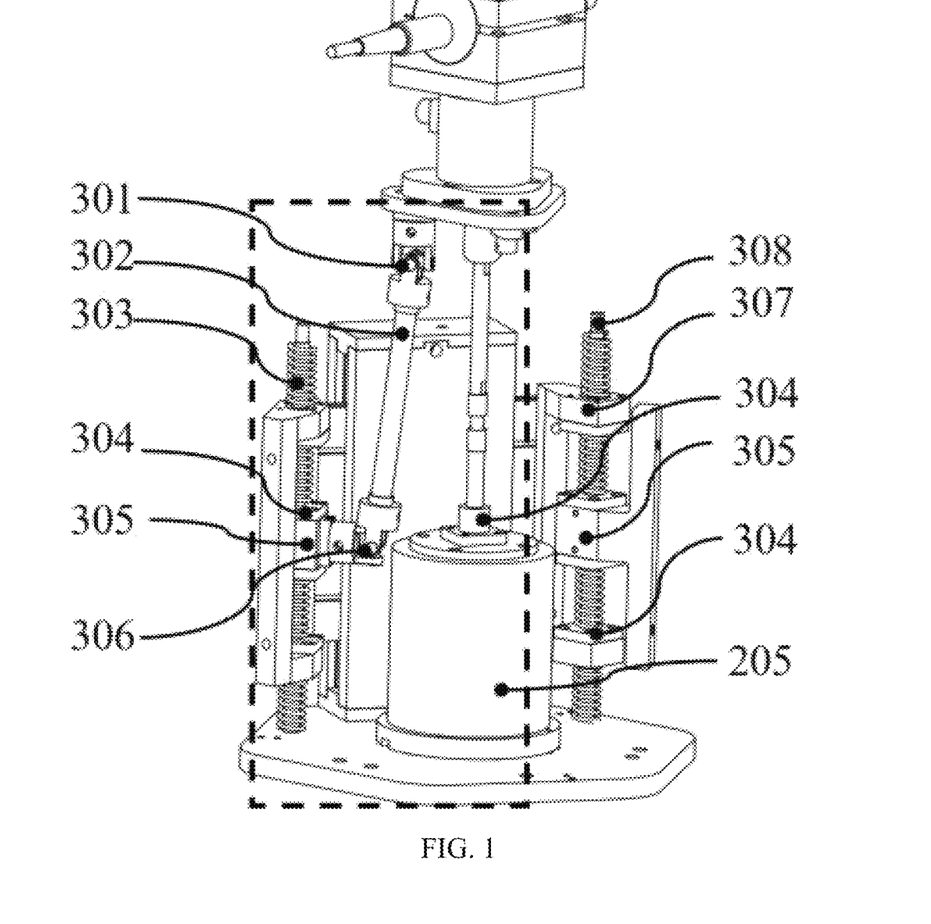
FIG. 1 is a detailed structural diagram of the non-stiffness electromagnetic drive branches provided by an embodiment of the present invention.

The non-stiffness electromagnetic drive branch includes an electromagnetic direct-drive motor module, a preload stiffness spring 303, a linear bearing 304, a support connector 1 (305), a support connector 2 (307), a linear bearing guide rail 308, a motor-side universal joint 306, a far motor-side universal joint 301, and a non-stiffness electromagnetic drive connecting rod 302.

The transmission process of the non-stiffness electromagnetic drive branches provided by the embodiments of the present invention is as follows: the electromagnetic direct-drive motor module generates a driving force, which moves along a line of the linear bearing guide rails through the support connector 1, and this linear moving is transmitted to the moving end plate 405 through the near-motor-end universal joint 306, the non-stiffness electromagnetic drive connecting rod 302, and the far-motor-end universal joint 301. The three non-stiffness electromagnetic drive branches act together on the moving end plate 405, enabling the moving end plate 405 to produce two rotational and one translational motion.

Figure 4:
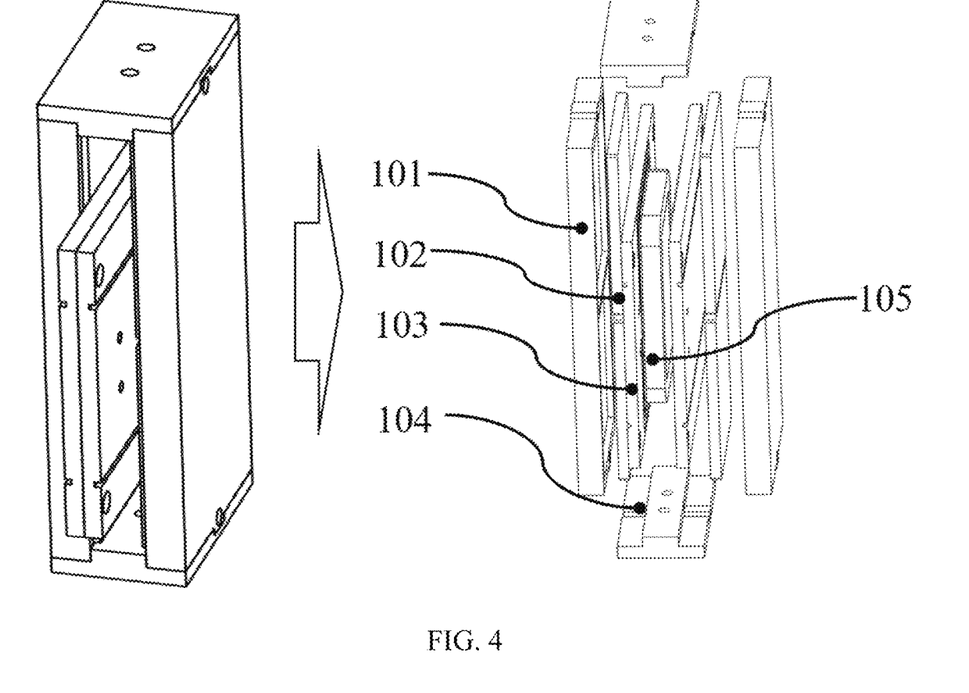
FIG. 4 is a schematic diagram of the electromagnetic direct drive module structure provided by an embodiment of the present invention.

The electromagnetic direct-drive motor module provided by the embodiments of the present invention includes a ferromagnetic yoke plate 101, a square permanent magnet 102, a coil support plate 103, a permanent magnet yoke plate support plate 104, and a square coil 105.

To balance a uniform transmission force of the electromagnetic direct-drive motor module in the non-stiffness electromagnetic drive branch and ensure stable displacement of the support plate 104 and the square coil 105 provided by the embodiments of the present invention, each coil support plate 103 is supported by both support connector 1 (305) and support connector 2 (307) during transmission, and moves along the linear bearing guide rail 309 via the linear bearing 304.

To reduce the volume of the actuator provided by the embodiments of the present invention, each linear bearing guide rail 309 accommodates support connector 1 (305) of one non-stiffness electromagnetic drive branch and support connector 2 (307) of another non-stiffness electromagnetic drive branch.

To prevent interference between support connector 1 (305) and support connector 2 (307) on the same linear bearing guide rail 309 during the motion of the electromagnetic direct-drive motor provided by the embodiments of the present invention, support connector 1 (305) and support connector 2 (307) are designed with complementary shapes and include reserved travel displacement.

The linear bearing guide rail 309 is equipped with four preload stiffness springs 303 provided by the embodiments of the present invention, to prevent collisions in the non-stiffness electromagnetic drive branch when not driven.

Figure 7:
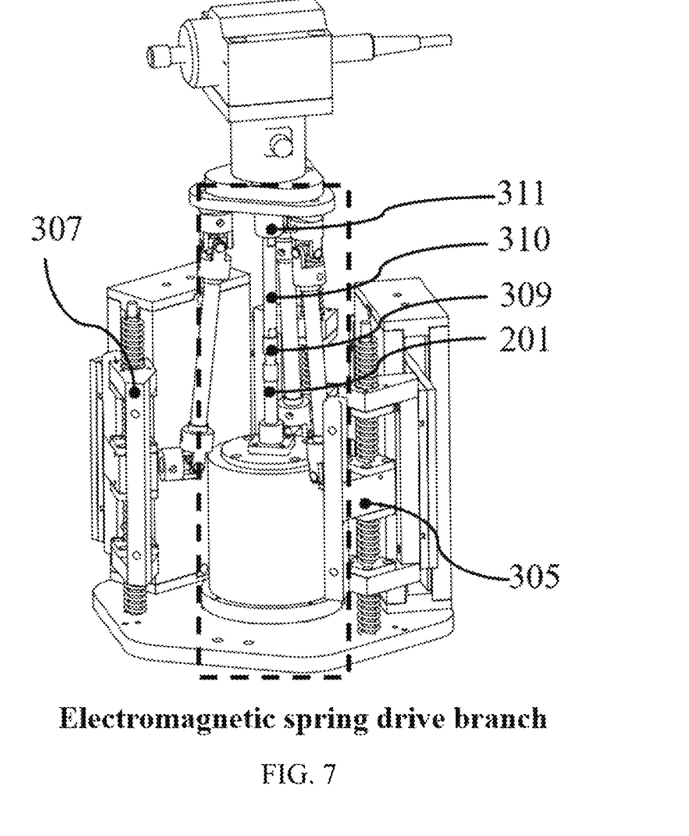
FIG. 7 is a detailed structural diagram of electromagnetic spring drive branches provided by an embodiment of the present invention.

The electromagnetic spring drive branch includes an electromagnetic spring module, a circular permanent magnet bracket-connecting rod 201, a double-headed ball valve 309, a ball valve connecting rod 310, and a single-headed ball valve 311.

A stiffness transmission process of the electromagnetic spring drive branch provided by the embodiments of the present invention is as follows: the electromagnetic spring module generates variable stiffness, which is transmitted to the moving end plate 405 through the circular permanent magnet bracket-connecting rod 201, the double-headed ball valve 309, the ball valve connecting rod 310, and the single-headed ball valve 311. A use of the double-headed ball valve 309 and the single-headed ball valve 311 prevents an introduction of variable stiffness from constraining the degrees of freedom of the moving end plate 405.

Figure 6:
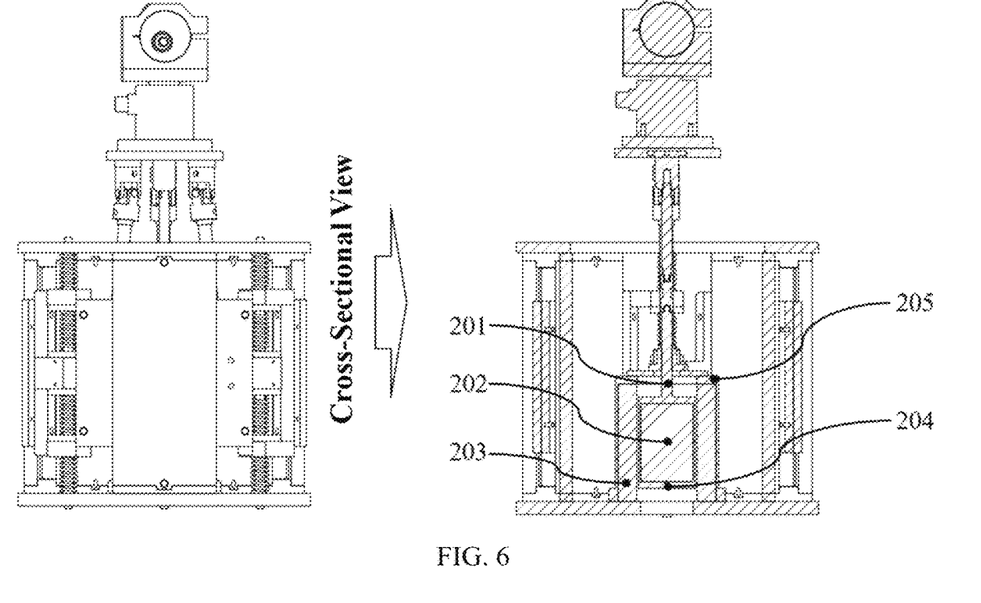
FIG. 6 is a schematic structural diagram of electromagnetic springs provided by an embodiment of the present invention.

The electromagnetic spring module includes a circular permanent magnet 202 and a circular coil 203 provided by the embodiments of the present invention. The magnetic field generated by the circular coil 203 is position-dependent, forming a non-uniform magnetic field along the axis. An interaction between the magnetic fields generated by the circular permanent magnet 202 and the circular coil 203 produces stiffness.

To ensure that the stiffness generated by the circular permanent magnet 202 is transmitted by the cylindrical support structure 204 provided by the embodiments of the present invention, the circular permanent magnet 202 is encapsulated inside the cylindrical support structure 204 and the circular permanent magnet bracket-connecting rod 201 by combining the cylindrical support structure 204 and the circular permanent magnet bracket-connecting rod 201.

Figure 2:
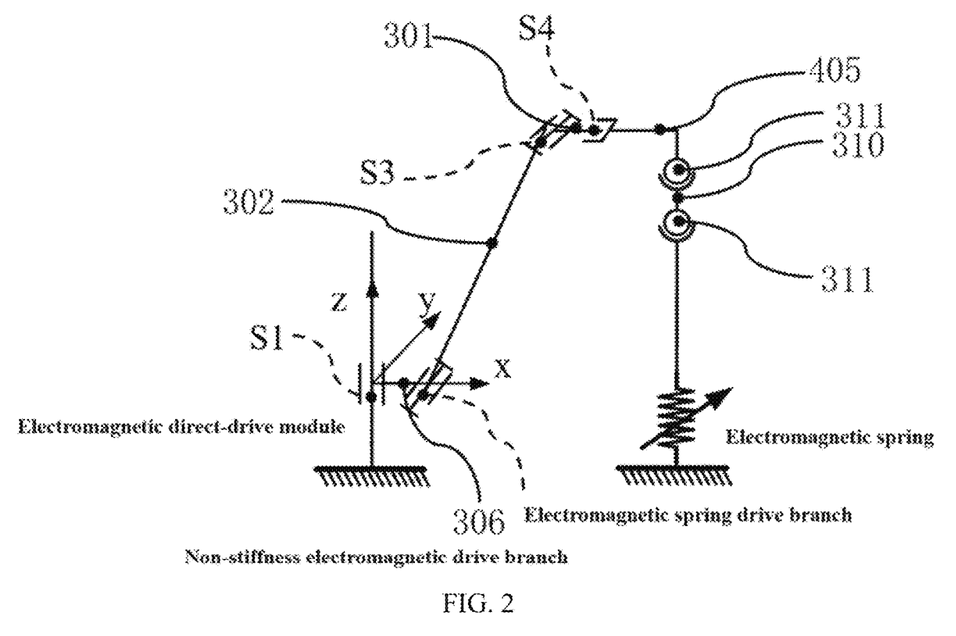
FIG. 2 is a schematic diagram of a construction principle of three-degree-of-freedom parallel branches provided by an embodiment of the present invention.

In one non-stiffness electromagnetic drive branch provided by the embodiments of the present invention, at the initial position, the motor-side universal joint 306 has two rotation axes, S3 and S4. The rotation axis S1 connected to the electromagnetic direct-drive motor module need be parallel to the z-axis, and the rotation axis S2 connected to the non-stiffness electromagnetic drive connecting rod 302 need be parallel to the y-axis. In the non-stiffness electromagnetic drive branch, the linear motion at the position of S1 is generated by the electromagnetic direct-drive motor module, rather than by a traditional motor screw transmission.

In one non-stiffness electromagnetic drive branch provided by the embodiments of the present invention, at the initial position, the far motor-side universal joint 301 has two rotation axes, S3 and S4. The rotation axis S3 connected to the non-stiffness electromagnetic drive connecting rod 302 need be parallel to the y-axis, and the rotation axis S4 connected to the moving end plate 405 need be parallel to the x-axis.

The initial position of the actuator is defined as follows: the moving end plate 405 and the robotic fixed end plate 404 are parallel, and the ball valve connecting rod 310 is perpendicular to the parallel position of the moving end plate 405 and the robotic fixed end plate 404.

Figure 8:
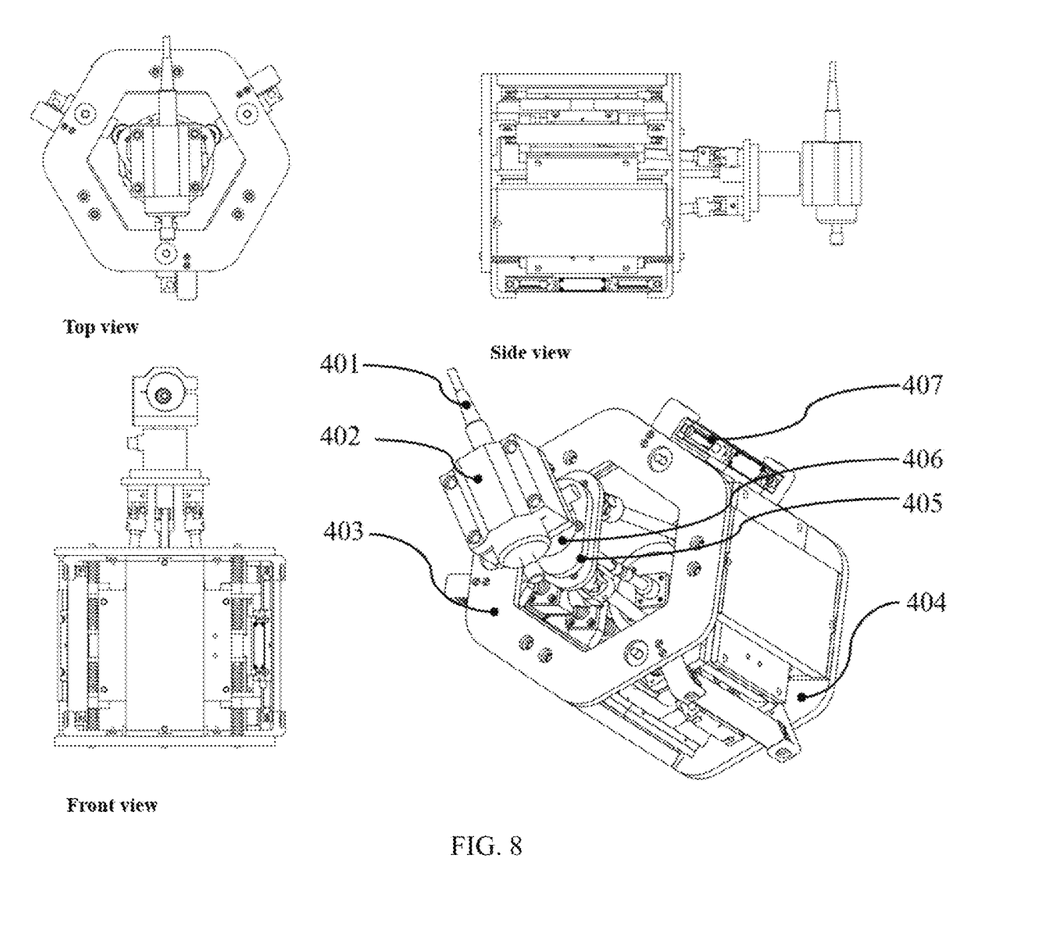
FIG. 8 is a three-view and axonometric view diagram of a three-degree-of-freedom parallel electromagnetic variable stiffness actuator as an end effector for robotic grinding and polishing provided in an embodiment of the present invention.

The structural components and peripheral sensor system include a main shaft 401, a main shaft clamp 402, a non-stiffness electromagnetic drive branch integrated fixing plate 403, a robotic fixed end plate 404, a moving end plate 405, a force sensor 406, and a grating scale displacement sensor 407.

Through feedback from the force sensor and the grating scale displacement sensor provided by the embodiments of the present invention, precise force control and displacement control can be achieved.

Through the main shaft 401, the main shaft clamp 402, the non-stiffness electromagnetic drive branch integrated fixing plate 403, the robotic fixed end plate 404, and the moving end plate 405, the robot end can be fixed and processed.

Another objective of the present invention is to provide a method for a three-degree-of-freedom parallel electromagnetic variable stiffness actuator as an end effector for robotic grinding and polishing, including:

Step 1: the electromagnetic direct-drive module is used to generate a direct-drive force, which is compliant rather than rigid.

Step 2: three parallel non-stiffness electromagnetic drive branches are constructed, using the electromagnetic direct-drive module to generate direct-drive force and achieve three-degree-of-freedom motion of the actuator.

Step 3: an electromagnetic spring drive branch directly connected in parallel to the end is constructed, generating stiffness to adapt to different operating environments and task requirements.

Step 4: precise control is achieved through the sensor system, using the sensor system to monitor and control force and displacement.

Step 5: According to the characteristics of the branches, a specific branch layout is adopted to effectively achieve three-degree-of-freedom motion while introducing stiffness control at the end.

Step 6: Through structural design, the overall structure of the actuator is effectively integrated, ensuring the functionality and stability of the actuator while effectively reducing its volume.

The specific implementation of the present invention is as follows:

The core of the technical solution of the present invention lies in the development of a three-degree-of-freedom parallel electromagnetic variable stiffness actuator as an end effector for robotic grinding and polishing. The essential technical features include: non-stiffness electromagnetic drive branches, whose drive motor is an electromagnetic direct-drive motor module, and according to the force transmission characteristics, this force is completely compliant; three non-stiffness electromagnetic drive branches can generate three-degree-of-freedom motion; an electromagnetic spring drive branch, whose drive motor is an electromagnetic spring, is responsible for providing adjustable stiffness; and meticulously designed structural components and peripheral sensor systems, is used for clever connections between structures and to achieve precise force and displacement control. These comprehensive technical features allow the actuator with flexibility, efficiency, and adaptability in the field of robotics.

The present invention is implemented as follows: a three-degree-of-freedom parallel electromagnetic variable stiffness actuator as an end effector for robotic grinding and polishing, characterized by comprising non-non-stiffness electromagnetic drive branches, an electromagnetic spring drive branch, and structural components and peripheral sensor systems.

Figure 3:
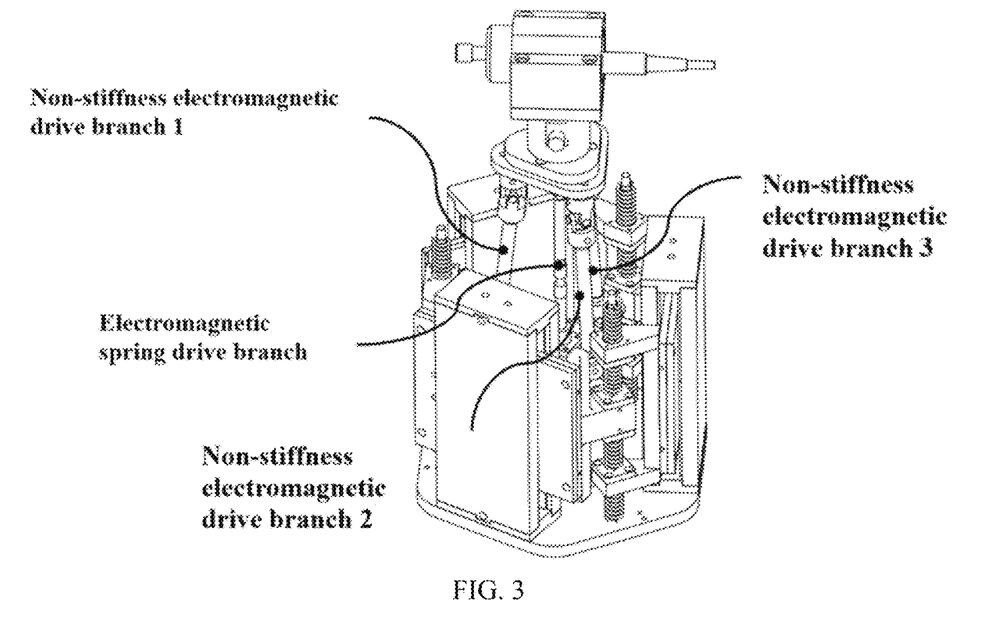
FIG. 3 is a schematic diagram of a distribution of three-degree-of-freedom parallel branches provided by an embodiment of the present invention.

An overall chain distribution is as follows:

A branch refers to an entire chain from the drive generation module to the actuator module. As shown in FIG. 3, a three-degree-of-freedom parallel electromagnetic variable stiffness actuator at the end of a robot includes three non-stiffness electromagnetic drive branches, namely non-stiffness electromagnetic drive branch 1, non-stiffness electromagnetic drive branch 2, and non-stiffness electromagnetic drive branch 3. One end of each non-stiffness electromagnetic drive branch is directly connected to the end-actuator motion plate 405, while the other end is connected to the robotic fixed end plate 404. The three branches with the same construction are uniformly distributed around the central axis of the actuator.

As shown in FIG. 3, to integrate and reduce the volume of the actuator while ensuring the transmission of stiffness, the electromagnetic spring drive branch is designed to be located at the central axis of the actuator. One end of this branch is directly connected to the moving end plate 405, while the other end is connected to the robot end fixed plate 404.

As shown in FIG. 2, both the electromagnetic spring drive branch and the three non-stiffness electromagnetic drive branches are connected to the moving end plate 405 and the robot end fixed plate 404, forming a parallel transmission configuration. Since the three non-stiffness electromagnetic drive branches are uniformly distributed around the central axis, which is the electromagnetic spring drive branch, only one non-stiffness electromagnetic drive branch is illustrated in FIG. 2 for simplicity.

As shown in FIG. 2, within one non-stiffness electromagnetic drive branch, at the initial position, the motor-side universal joint 306 has two rotation axes, S3 and S4. The rotation axis S1 connected to the electromagnetic direct-drive motor module need be parallel to the z-axis, while the rotation axis S2 connected to the non-stiffness electromagnetic drive connecting rod 302 need be parallel to the y-axis. It is particularly important to note that in the non-stiffness electromagnetic drive branch, the linear motion at the position of S1 is generated by the electromagnetic direct-drive motor module, rather than through a traditional motor-screw transmission.

As shown in FIG. 2, within one non-stiffness electromagnetic drive branch, at the initial position, the far motor-side universal joint 301 has two rotation axes, S3 and S4. The rotation axis S3 connected to the non-stiffness electromagnetic drive connecting rod 302 need be parallel to the y-axis, while the rotation axis S4 connected to the moving end plate 405 need be parallel to the x-axis.

The construction of the three non-stiffness electromagnetic drive branches is as follows:

As shown in FIG. 1, the non-stiffness electromagnetic drive branch includes an electromagnetic direct-drive motor module, a preload stiffness spring 303, a linear bearing 304, a support connector 1 (305), a support connector 2 (307), a linear bearing guide rail 308, a motor-side universal joint 306, a far motor-side universal joint 301, and a non-stiffness electromagnetic drive connecting rod 302.

Combining FIGS. 2 and 1, the transmission process of the non-stiffness electromagnetic drive branches is as follows: the electromagnetic direct-drive motor module generates a driving force, which moves along a line of the linear bearing guide rail 309 through the support connector 1 (305). This linear moving is then transmitted to the moving end plate 405 through the motor-side universal joint 306, the non-stiffness electromagnetic drive connecting rod 302, and the far motor-side universal joint 301. The three non-stiffness electromagnetic drive branches with the same transmission path jointly act on the moving end plate 405, enabling the moving end plate 405 to produce two rotational and one translational motion.

The electromagnetic direct-drive motor module includes a ferromagnetic yoke plate 101, a square permanent magnet 102, a coil support plate 103, a permanent magnet yoke support plate 104, and a square coil 105. This structure is designed to provide electromagnetic direct driving force without the need for rotational transmission.

As shown in FIG. 2, to balance a uniform transmission force of the electromagnetic direct-drive motor module in the non-stiffness electromagnetic drive branches and ensure a stable displacement of the support plate 104 and the square coil 105, each coil support plate 103 is simultaneously supported by the support connector 1 (305) and the support connector 2 (307) during transmission, and moves along the linear bearing guide rail 309 via the linear bearing 304.

As shown in FIG. 2, to integrate and reduce the volume of the actuator, each linear bearing guide rail 308 accommodates the support connector 1 (305) of one non-stiffness electromagnetic drive branch and the support connector 2 (307) of another non-stiffness electromagnetic drive branch.

As shown in FIGS. 1 and 3, to ensure that the support connector 1 (305) and the support connector 2 (307) on the same linear bearing guide rail 308 do not interfere during the motion of the corresponding electromagnetic direct-drive motor, as shown in FIG. 4, the support connector 1 (305) and the support connector 2 (307) are designed with complementary shapes and include reserved travel displacement.

As shown in FIG. 3, the linear bearing guide rail 308 is equipped with four preload stiffness springs 303 to prevent collisions in the non-stiffness electromagnetic drive branch when it is not driven.

Figure 5:
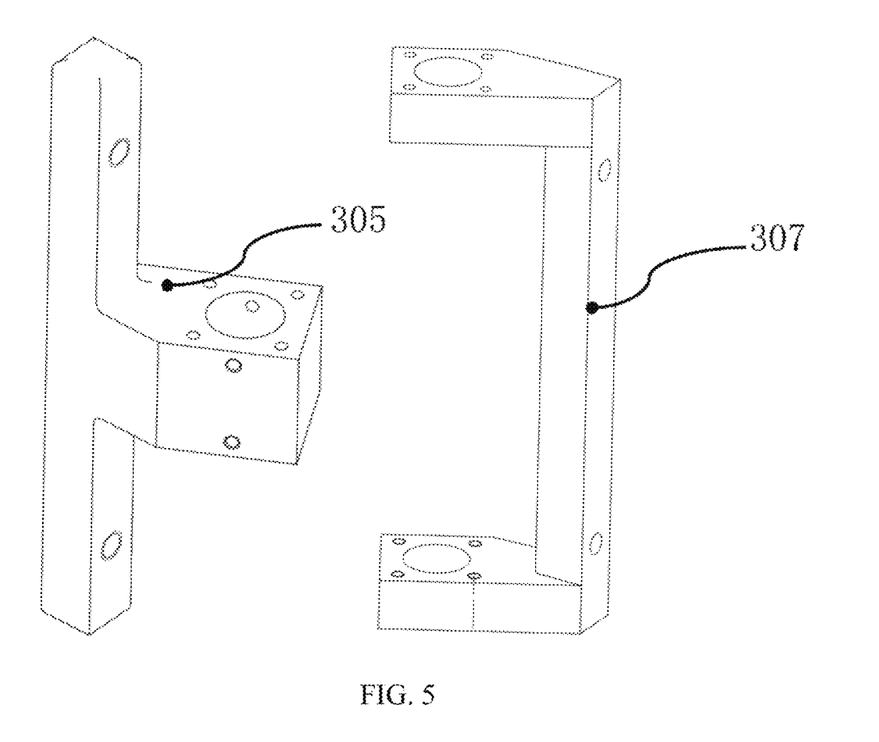
FIG. 5 is a schematic diagram of a complementary support connector provided by an embodiment of the present invention.

The construction of the electromagnetic spring drive branch is as follows:

As shown in FIGS. 5 and 6, the electromagnetic spring drive branch includes an electromagnetic spring module, a circular permanent magnet bracket-connecting rod 201, a double-headed ball valve 309, a ball valve connecting rod 310, and a single-headed ball valve 311.

As shown in FIG. 6, the stiffness transmission process of the electromagnetic spring drive branch is as follows: the electromagnetic spring module generates variable stiffness, which is transmitted to the moving end plate 405 through the circular permanent magnet bracket-connecting rod 201, the double-headed ball valve 309, the ball valve connecting rod 310, and the single-headed ball valve 311. The use of the double-headed ball valve 309 and the single-headed ball valve 311 prevents the introduction of variable stiffness from constraining the degrees of freedom of the moving end plate 405.

As shown in FIG. 5, the electromagnetic spring module includes a circular permanent magnet 202 and a circular coil 203. The magnetic field generated by the circular coil is position-dependent, forming a non-uniform magnetic field along the central axis. The interaction between the magnetic fields generated by the circular permanent magnet and the circular coil produces stiffness.

As shown in FIG. 5, to ensure that the stiffness generated by the circular permanent magnet 202 is transmitted by the cylindrical support structure 204, the circular permanent magnet 202 is encapsulated inside the cylindrical support structure 204 and the circular permanent magnet bracket-connecting rod 201 by combining the cylindrical support structure 204 and the circular permanent magnet bracket-connecting rod 201.

As shown in FIG. 7, the initial position of the actuator is defined as follows: the moving end plate 405 and the robotic fixed end plate 404 are parallel, and the ball valve connecting rod 310 is perpendicular to the parallel position of the moving end plate 405 and the robotic fixed end plate 404.

As shown in FIG. 8, the structural components and peripheral sensor system include a main shaft 401, a main shaft clamp 402, a non-stiffness electromagnetic drive branch integrated fixing plate 403, a robotic fixed end plate 404, a moving end plate 405, a force sensor 406, and a grating scale displacement sensor 407. Through the feedback from the force sensor and the displacement sensor, precise force control and displacement control can be achieved. The main shaft 401, the main shaft clamp 402, the non-stiffness electromagnetic drive branch integrated fixing plate 403, the robotic fixed end plate 404, and the moving end plate 405 enable the fixing and machining of the robot end.

(1) Specific Applications of the Invention or Related Products:

High-precision grinding and polishing of complex surfaces: grinding and polishing of complex curved parts in the aerospace industry; grinding and polishing of automotive body and engine parts in the automotive manufacturing industry; high-precision surface treatment in mold manufacturing.

Precision machining and assembly: assembly and debugging of precision instruments and equipment; precision welding and assembly in the electronics manufacturing industry; high-precision machining in medical device manufacturing.

Medical surgical robots: high-precision and compliant operations in surgical robots, such as minimally invasive surgical robots; rehabilitation robots for precise rehabilitation training and assistance.

Research and education: experimental platforms in robotics and control engineering research; teaching and research equipment in universities and research institutions.

Industrial automation: high-precision force-controlled operations in flexible manufacturing systems; precision assembly and inspection in automated production lines.

Technical Effects of the Invention (2) Evidences Related to Technical Effects Obtained in the Embodiments of the Present Invention:

Precise stiffness adjustment and force control: real-time stiffness adjustment through current control of the electromagnetic spring, adapting to different processing environments and materials; precise force and displacement control using feedback from force sensors and displacement sensors.

High compliance and adaptability: non-stiffness electromagnetic drive branches ensure compliance during motion, adapting to grinding and polishing needs of complex surfaces; electromagnetic variable stiffness technology provides higher environmental adaptability and operational flexibility.

Actuator performance of high responsiveness and low latency: the electromagnetic direct-drive motor module enables fast response and low-latency drive control, improving a dynamic performance of the actuator; the three-degree-of-freedom parallel structure design provides an efficient motion and force transmission paths, further enhancing the actuator performance.

Reduced control costs and complexity: a separation and decoupling of the stiffness transmission branch and the motion branch enable independent control of three-degree-of-freedom motion and stiffness, simplifying control system design; modular design facilitates system maintenance and upgrades, reducing overall costs.

It should be noted that the implementation of the invention can be achieved through hardware, software, or a combination of both. The hardware part can be implemented using dedicated logic, while the software part can be stored in memory and executed by an appropriate instruction execution system, such as a microprocessor or specially designed hardware. Those skilled in the art will understand that the above-mentioned devices and methods can be implemented using computer-executable instructions and/or included in processor control code, for example, on carrier medium such as disks, CD or DVD-ROMs, programmable memory such as read-only memory (firmware), or data carriers such as optical or electronic signal carriers. The devices and modules of the invention can be implemented by hardware circuits such as very large-scale integrated circuits or gate arrays, semiconductors such as logic chips or transistors, or programmable hardware devices such as field-programmable gate arrays or programmable logic devices. They can also be implemented by software executed by various types of processors or by a combination of hardware circuits and software, such as firmware.

The above descriptions are only specific implementations of the invention, but the scope of protection of the invention is not limited to this. Within the scope of the technology disclosed by the present invention, any modifications, equivalent replacements, and improvements made by those skilled in the art within the spirit and principles of the invention shall be included within the scope of protection of the invention.

What is claimed is:

1. A three-degree-of-freedom parallel electromagnetic variable stiffness actuator as an end effector for robotic grinding and polishing, comprising:
    non-stiffness electromagnetic drive branches, an electromagnetic spring drive branch, structural components, and peripheral sensor systems;
    there are three non-stiffness electromagnetic drive branches, namely non-stiffness electromagnetic drive branch 1, non-stiffness electromagnetic drive branch 2, and non-stiffness electromagnetic drive branch 3; one end of the non-stiffness electromagnetic drive branches is directly connected to a moving end plate, and the other end is connected to a robotic fixed end plate; the three non-stiffness branches of the same construction are evenly distributed around a central axis of the actuator;

the electromagnetic spring drive branch is located at the central axis of the actuator, with one end directly connected to the moving end plate and the other end connected to the robotic fixed end plate;

the electromagnetic spring drive branch and the three non-stiffness electromagnetic drive branches are all connected to the moving end plate and the robotic fixed end plate, forming a parallel transmission configuration;

the non-stiffness electromagnetic drive branch includes an electromagnetic direct-drive motor module, a preload stiffness spring, a linear bearing, a support connector 1, a support connector 2, a linear bearing guide rail, a motor-side universal joint, a far motor-side universal joint, and a non-stiffness electromagnetic drive connecting rod;

a transmission process of the non-stiffness electromagnetic drive branches is as follows: the electromagnetic direct-drive motor module generates a driving force, which moves along a line of the linear bearing guide rail through the support connector 1, and this linear moving is transmitted to the moving end plate through the motor-side universal joint, the non-stiffness electromagnetic drive connecting rod, and the far motor-side universal joint; the three non-stiffness electromagnetic drive branches with the same transmission route jointly act on the moving end plate, enabling the moving end plate to produce two rotational and one translational motion;

the electromagnetic spring drive branch includes an electromagnetic spring module, a circular permanent magnet bracket-connecting rod, a double-headed ball joint, a ball joint connecting rod, and a single-headed valve ball joint;

a stiffness transmission process of the electromagnetic spring driving branch is as follows: the electromagnetic spring module generates variable stiffness, which is transmitted to the moving end plate through the circular permanent magnet bracket-connecting rod, the double-headed ball joint, the ball joint connecting rod, and the single-headed ball joint; a use of the double-headed ball joint and the single-headed ball joint is to prevent an introduction of variable stiffness from constraining the degrees of freedom of the moving end plate.

2. The three-degree-of-freedom parallel electromagnetic variable stiffness actuator as an end effector for robotic grinding and polishing according to claim 1, wherein the electromagnetic direct-drive motor module comprises a ferromagnetic yoke plate, a square permanent magnet, a coil support plate, a permanent magnet yoke support plate, and a square coil.

3. The three-degree-of-freedom parallel electromagnetic variable stiffness actuator as an end effector for robotic grinding and polishing according to claim 1, wherein the linear bearing guide rail is equipped with four preload stiffness springs.

4. The three-degree-of-freedom parallel electromagnetic variable stiffness actuator as an end effector for robotic grinding and polishing according to claim 1, wherein the electromagnetic spring module includes a circular permanent magnet and a circular coil, where the magnetic field generated by the circular coil is position-dependent, forming a non-uniformly distributed magnetic field along the axis, and the interaction between the magnetic field generated by the circular permanent magnet and the circular coil produces stiffness.

5. The three-degree-of-freedom parallel electromagnetic variable stiffness actuator as an end effector for robotic grinding and polishing according to claim 1, wherein the structural components and peripheral sensor systems include a main shaft, a main shaft clamp, an non-stiffness electromagnetic drive branch integrated fixing plate for the robotic fixed end plate, the moving end plate, a force sensor, and a grating scale displacement sensor;

the force sensor and the displacement sensor provide feedback to achieve precise force control and displacement control;

the main shaft, main shaft clamp, the non-stiffness electromagnetic drive branch integrated fixing plate, the robotic fixed end plate, and the moving end plate enable the fixing and processing at the end of the robot.

\* \* \* \* \*